US012315352B1

(12) United States Patent
Smith et al.

(10) Patent No.: US 12,315,352 B1
(45) Date of Patent: May 27, 2025

(54) MONITORING AND REACTING TO NEARBY MOVING VEHICLES

(71) Applicant: United Services Automobile Association (USAA), San Antonio, TX (US)

(72) Inventors: Arthur Quentin Smith, Fredericksburg, TX (US); Oscar Guerra, San Antonio, TX (US); Robert Lee Black, San Antonio, TX (US); Timothy Blair Chalmers, San Antonio, TX (US); Justin Dax Haslam, San Antonio, TX (US); Noe Alberto Martinez, San Antonio, TX (US); Jon D. McEachron, Boerne, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 0 days.

(21) Appl. No.: 18/128,851

(22) Filed: Mar. 30, 2023

Related U.S. Application Data (60) Provisional application No. 63/325,466, filed on Mar. 30, 2022.

(51) Int. Cl.

| | |
|---|---|
| *G08B 21/02* | (2006.01) |
| *B60W 30/09* | (2012.01) |
| *G06V 20/56* | (2022.01) |
| *G06V 20/62* | (2022.01) |
| *G06V 40/16* | (2022.01) |

(52) U.S. Cl.
CPC ............ *G08B 21/02* (2013.01); *B60W 30/09* (2013.01); *G06V 20/56* (2022.01); *G06V 20/625* (2022.01); *G06V 40/16* (2022.01)

(58) Field of Classification Search
CPC ....... G08B 21/02; B60W 30/09; G06V 20/56; G06V 20/625; G06V 40/16
See application file for complete search history.

(56) References Cited

U.S. PATENT DOCUMENTS

| | | | | |
|---|---|---|---|---|
| 6,121,898 | A * | 9/2000 | Moetteli | G08G 1/052 340/936 |
| 6,433,706 | B1 * | 8/2002 | Anderson, III | G08G 1/017 340/933 |
| 10,395,332 | B1 * | 8/2019 | Konrardy | G05D 1/0246 |
| 10,997,430 | B1 * | 5/2021 | Slavin | G06V 20/56 |
| 11,954,921 | B2 * | 4/2024 | Zhu | G06V 20/58 |

* cited by examiner

*Primary Examiner* — John A Tweel, Jr.
(74) *Attorney, Agent, or Firm* — Fletcher Yoder, P.C.

(57) ABSTRACT

A method may include receiving, via at least one processor, alert data that may include an alert associated with a vehicle identifier of an additional vehicle and location data. The method may then include cross referencing the alert data with image data to identify a match between the alert data and the image data, such that the image data is acquired over a period of time by one or more image sensors coupled to a vehicle. The method may also include presenting a notification via an electronic display of the vehicle in response to identifying a match between the alert data and the image data.

19 Claims, 4 Drawing Sheets

MONITORING AND REACTING TO NEARBY MOVING VEHICLES

CROSS-REFERENCE TO RELATED APPLICATIONS

This application claims priority to U.S. Provisional Application No. 63/325,466, filed Mar. 30, 2022, entitled "MONITORING AND REACTING TO NEARBY MOVING VEHICLES," the disclosure of which is incorporated by reference in its entirety for all purposes.

BACKGROUND

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admission of prior art.

The present disclosure relates generally to monitoring nearby moving vehicles. More specifically, the present disclosure relates to monitoring nearby moving vehicles to glean additional information about the drivers, the passengers, or both.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In one embodiment, a method may include receiving, via at least one processor, alert data that may include an alert associated with a vehicle identifier of an additional vehicle and location data. The method may then include cross referencing the alert data with image data to identify a match between the alert data and the image data, such that the image data is acquired over a period of time by one or more image sensors coupled to a vehicle. The method may also include presenting a notification via an electronic display of the vehicle in response to identifying a match between the alert data and the image data.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

Crowdsourcing data collection for vehicles may provide a new opportunity to glean various types of data that may otherwise be difficult to gather. Accordingly, it may be advantageous to have vehicles equipped with the ability to observe nearby vehicles. This may help with providing enhanced location services, defensive driving information, and the like. For example, if a missing person alert is initiated, the monitor systems may collect data (image, motion, radio wave, Bluetooth, cellular, etc.,) from vehicles and surroundings over a vast area to help potentially identify the location of the missing person. Additionally, driving behaviors of vehicles on the road may be viewable during the sporadic timings of said driving behaviors. As such, much driving behaviors are not witnessed by authorities tasked with policing neglectful (e.g., speeding, swerving) driving behaviors. However, the monitor systems may assist in identifying these types of driving behaviors and providing the collected data to other drivers, authorities, and the like.

With the foregoing in mind, in some embodiments, a vehicle system may acquire image data of surrounding vehicles. The vehicle system may further receive alert data with information regarding a missing person, a person of interest, a missing object, a road condition, fire, flood, or similar information. The vehicle system may compare the data of surrounding vehicles and environmental elements with the alert data to determine if there is a match. In the event of a match, the driver of the vehicle may be notified, the proper authorities may be notified, or the like.

Further, in some embodiments, the vehicle system may gather information on nearby drivers such as the license plate of a nearby vehicle or a nearby driver's driving behaviors. The vehicle system may generate or add to a profile for the nearby driver, which may include information regarding the driver's driving tendencies, records of accidents, etc. This information may be gathered and compiled in real-time as the vehicle is driving. In some embodiments, the gathered information may be accessed and owned by the owner of the vehicle, an insurance company tracking the data, or any other suitable entity. Additional detail with regard to these features, and others, will be discussed in detail below with reference to FIGS. 1-4.

Figure 1:
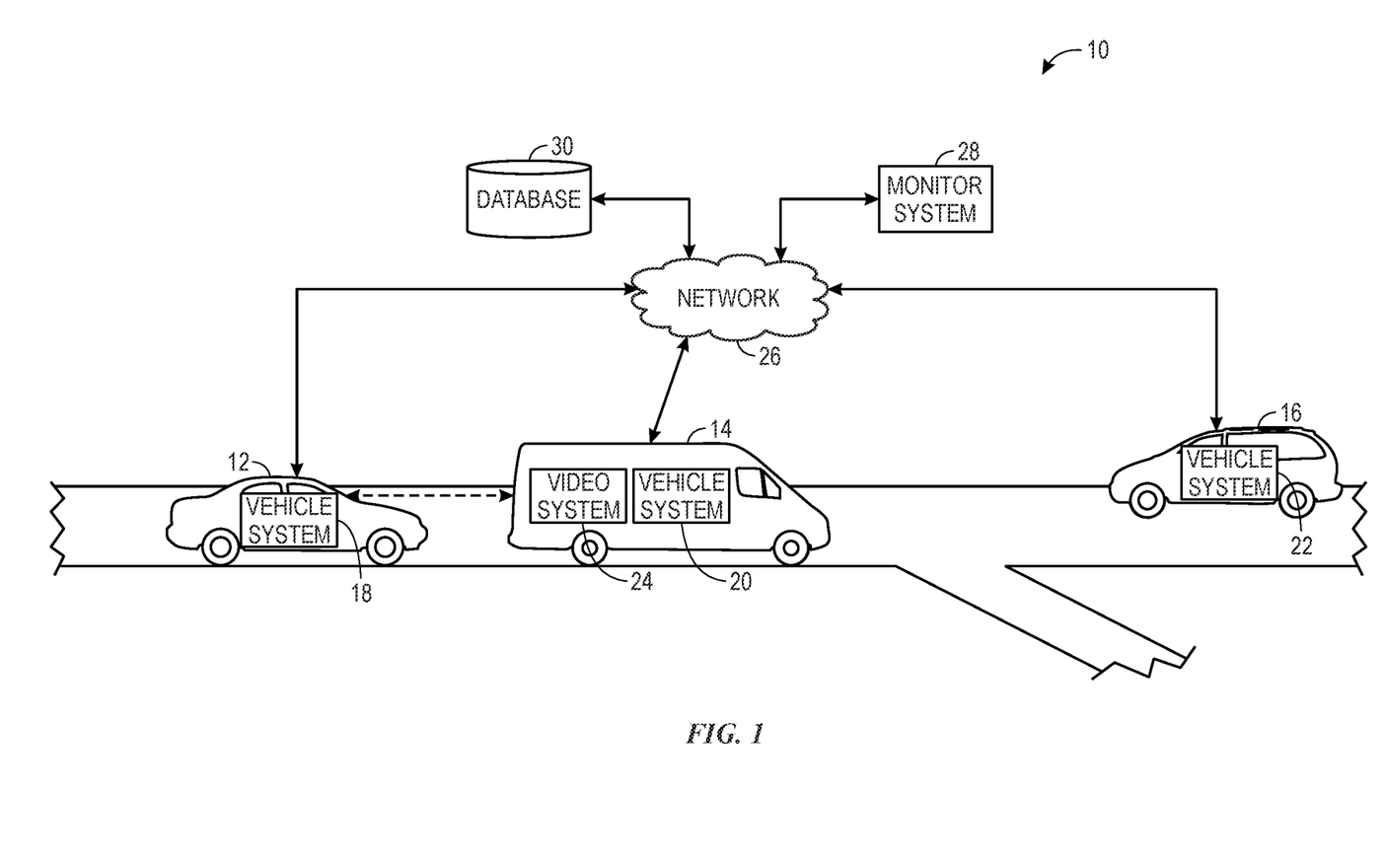
FIG. 1 illustrates a diagram of a system for receiving data from various sources including vehicle systems, in accordance with embodiments described herein.

By way of introduction, FIG. 1 illustrates a diagram of a system 10 of different vehicle systems and other devices that may communicate with each other to verify received or detected vehicle operation signals. Referring to FIG. 1, the system 10 may include a number of vehicles 12, 14, and 16 that may include a number of vehicle systems 18, 20, and 22, respectively. In certain embodiments, the vehicle systems 18, 20, and 22 may be any suitable control or computing device that receives sensor data, user input data, and the like to assist in operating various aspects of the respective vehicle, determine how operations (e.g., acceleration, braking, driving properties) should be controlled, and the like. In some embodiments, the vehicle systems 18, 20, and 22 may be autonomous or semi-autonomous vehicles that control all or some driving operations of the vehicles 12, 14, and 16, or switches between autonomous driving and providing a user the ability to drive the respective vehicle.

In addition to receiving data from the other vehicle systems 20 and 22, the vehicle system 18 may receive data from other devices via a network 26 or directly from other devices. The network 26 may be any suitable wired or wireless (e.g., radio or light based) network that may facilitate communication of data between devices. In some embodiments, the network 26 may be a Wi-Fi network, a light detection and ranging (LIDAR) network, a LIDAR device, a 4G network, a 4G LTE network, a 5G network, a Bluetooth network, a Near Field Communication (NFC) network, or any suitable network for communicating information between devices.

Referring back to the vehicles 12, 14, and 16, the respective vehicle systems 18, 20, and 22 may communicatively couple to the network 26 to distribute data (e.g., vehicle operation signals, image data, notification data) to other vehicle systems, a monitor system 28, a database 30, or the like. The database 30 may be any suitable database, and may be local to the system 10 or else may be remote and accessed remotely by the network 26. The database 30 may store some or all of the data received by the network 26.

The monitor system 28 may be any suitable computing device, service device, cloud-computing device, or the like that may collect data from a variety of sources and assist the vehicle systems 18, 20, and 22 in determining how to control or adjust operations of the respective vehicles 12, 14, and 16.

Referring back to the vehicle 14, in addition to the vehicle system 20, the vehicle 14 may include a video system 24. The video system 24 may include one or more image sensors that may be positioned on the front, side, rear, road, sky, or a combination of angles around the vehicle 14. Further, the system may use one or more image sensors that are not physically connected to the vehicle, such as a stationary device(s) on the side of the road, on a sign, etc. For example, in some embodiments, the image sensors may become available to the vehicle when the vehicle is within communication ranges of the image sensors, such as when a vehicle is near an intersection with a traffic light including an image sensor. Further, in embodiments, the vehicles 12, 14, and 16, as well as others, may share image data with each other when within a communication range of each other. The video system 24 may send or receive image data, such as still image data, video image data, or the like. Further, the video system 24 may send or receive location data, identifying a location associated with the acquired image data. The location data may be created by comparing the image data to recognized landmarks, using GPS, or other location identification methods. The video system 24 may be communicatively coupled to the monitor system 28, the database 30, the vehicle system 18, or any other suitable device via the network 26, via a direct communication link or the like.

In some instances, the image data may include details about the vehicle 12, or any other vehicle in the system 10. These details may include the license plate of the vehicle 12, the shape or style of the vehicle 12, and other identifying features of the vehicle 12. Further, the video system 24 may include facial recognition software that may be able to identify a driver or passenger of the vehicle 12 represented in the acquired image data. That is, the video system 24 may receive facial data for identifying persons from a storage component accessible via the network 26 and cross reference the acquired image data with the facial data to identify the individual in the image data. Additionally or alternatively, in some embodiments, the video system 24 may listen for (e.g., receive audio data) and capture metadata from devices with radios (smart phone, embedded tracker, worn device, smart glasses, etc.) associated with a person to identify the individual.

Figure 2:
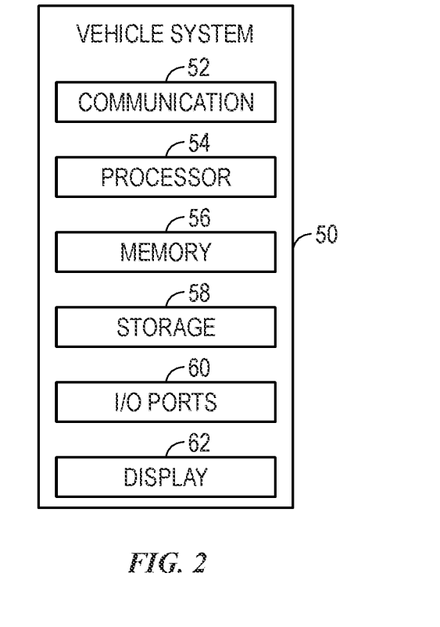
FIG. 2 illustrates a block diagram of a vehicle system that may be part of the system of FIG. 1, in accordance with embodiments described herein.

To perform some of the actions set forth above, the vehicle systems 18, 20, and 22 may include certain components to facilitate these actions. FIG. 2 is a block diagram of example components within a system 50 (which may represent any of the vehicle systems 18, 20, and 22, as well as the monitor system 28, or any other appropriate system). For example, the system 50 may include a communication component 52, a processor 54, a memory 56, a storage 58, input/output (I/O) ports 60, a display 62, and the like. The communication component 52 may be a wireless or wired communication component that may facilitate communication between the system 50, the network 26, the monitor system 28, and the like. Additionally, the communication component 52 may facilitate data transfer to the system 50, such that the system 50 may receive data from the other components depicted in FIG. 1 and the like.

The processor 54 may be any type of computer processor or microprocessor capable of executing computer-executable code. The processor 54 may also include multiple processors that may perform the operations described below.

The memory 56 and the storage 58 may be any suitable articles of manufacture that can serve as media to store processor-executable code, data, or the like. These articles of manufacture may represent computer-readable media (e.g., any suitable form of memory or storage) that may store the processor-executable code used by the processor 54 to perform the presently disclosed techniques. The memory 56 and the storage 58 may also be used to store data described, various other software applications for analyzing the data, and the like. The memory 56 and the storage 58 may represent non-transitory computer-readable media (e.g., any suitable form of memory or storage) that may store the processor-executable code used by the processor 54 to perform various techniques described herein. It should be noted that non-transitory merely indicates that the media is tangible and not a signal.

The I/O ports 60 may be interfaces that may couple to other peripheral components such as input devices (e.g., keyboard, mouse), sensors, input/output (I/O) modules, and the like. The display 62 may operate to depict visualizations associated with software or executable code being processed by the processor 54. In one embodiment, the display 62 may be a touch display capable of receiving inputs from a user of the system 50. The display 62 may be any suitable type of display, such as a liquid crystal display (LCD), plasma display, or an organic light emitting diode (OLED) display, for example. Additionally, in one embodiment, the display 62 may be provided in conjunction with a touch-sensitive mechanism (e.g., a touch screen) that may function as part of a control interface for the system 50. It should be noted that the components described above with regard to the system 50 are exemplary components and the system 50 may include additional or fewer components as shown.

Figure 3:
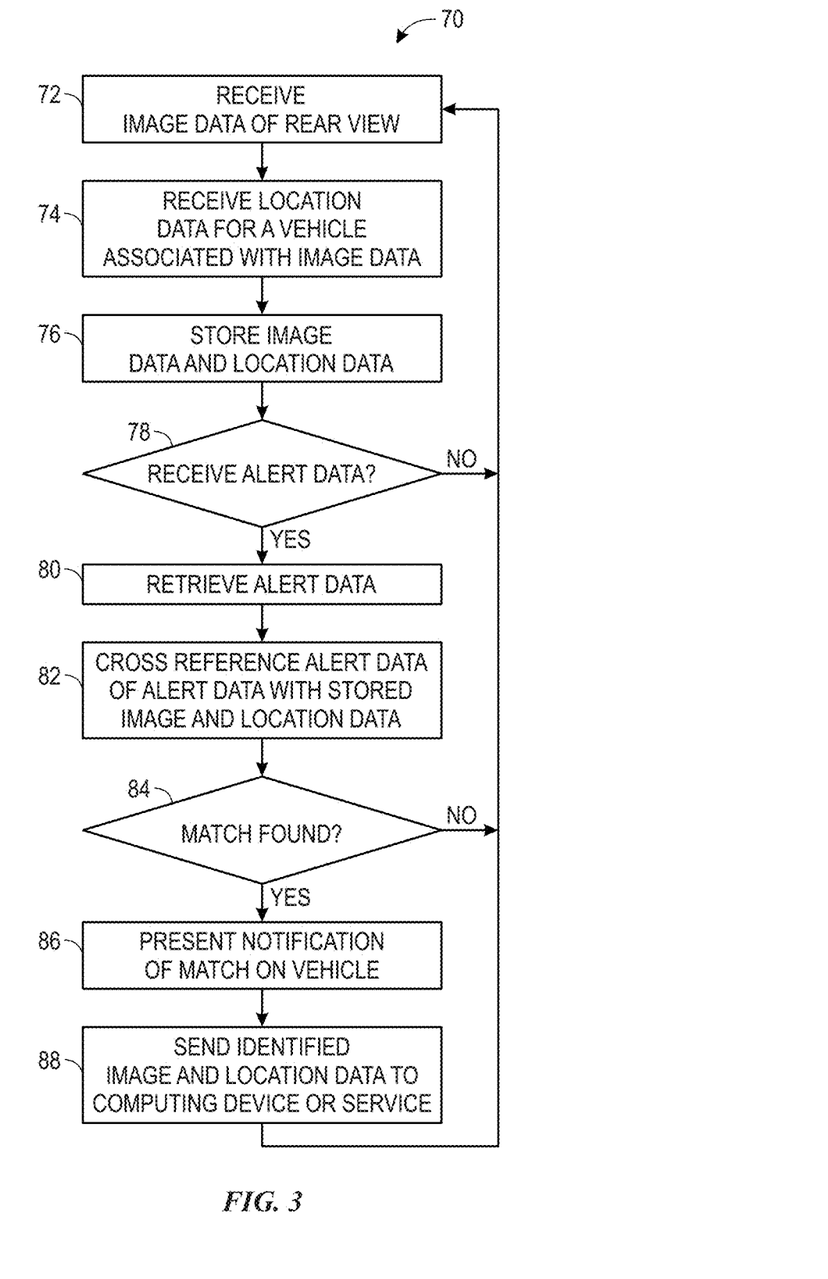
FIG. 3 illustrates a flow chart of a method for determining whether a nearby vehicle is associated with missing person data, in accordance with embodiments described herein.

The vehicle system 20 may utilize the system 50 to perform various features, such as monitoring nearby vehicles. With the foregoing in mind, FIG. 3 illustrates a flow chart of a method 70 employed by the vehicle system 20. Although the following description of the method 70 is described in a particular order, it should be noted that the method 70 is not limited to the depicted order; and, instead, the method 70 may be performed in any suitable order. In addition, although the vehicle system 20 is described as performing the method 70, it should be understood that the method 70 may be performed by any suitable computing device including, for instance, the monitor system 28 and the like.

Accordingly, in block 72, the vehicle system 20, may be programmed to receive image data of a view (e.g., a rear view) of the vehicle 12. In some instances this image data may come from the video system 24. Additionally or alternatively, the image data may be sent to the vehicle system 20 from the network 26, and may originate from any image sensing device in the system 10. In some embodiments, the vehicle system 20 may be programmed to receive the image data continuously according to some frequency. However, the vehicle system 20 may also selectively choose, or allow an owner of the vehicle 14 to selectively choose, at what time periods or instances the image data should be received by the vehicle system 20. For instance, the vehicle system 20 may be set up by default to receive image data when the vehicle 14 is turned on. However, other time options, such as during a predefined time period (e.g., rush hour), during daylight or nighttime hours, or any other time period may be selected by the vehicle system 20 or an owner of the vehicle 14. Additionally or alternatively, the vehicle system 20 may be programmed to receive image data based on a triggering event. For instance, in some embodiments, the image data may be received when there is a vehicle, such as the vehicle 12, positioned within some threshold distance behind the vehicle 14. Other triggering events may include, but are not limited to, idling, braking, accelerating quickly, hard steering, stopping at a stop light or stop sign, turning onto a road, parking, turning on the vehicle 14, receiving a missing person alert, or any other triggering event.

Turning now to block 74, the vehicle system 20 may further be programmed to receive location data for a vehicle (or other object) associated with the received image data, such as the vehicle 12. For instance, if image data sent to the vehicle system 20 includes the vehicle 12, the vehicle system 20 may receive location data from location sensors or some other location identifying technology to attribute to the image data and thus the vehicle 12. The location data may describe a location, such as global positioning system (GPS) coordinates, of the vehicle 12. The location data may also be determined in a more approximate manner, such as by identifying landmarks in the image data that place the vehicle 12 in a known area. For example, if the image data includes both the vehicle 12 and a known public building, address, or other identifiable landmark, then such may be used to create approximate location data. Any other suitable method of mapping the location of the vehicle 12 may be used, and the examples described are not intended to be a comprehensive list of methods.

Further, as illustrated in block 76, the vehicle system 20 may then store the image data and location data. In some embodiments this data may be stored locally on the vehicle system 20, for example, in the memory 56. The data may be stored permanently on the vehicle system 20, or alternatively the data may be set to be automatically removed after a set period of time or after a threshold amount of data has been stored locally on the vehicle system 20. However, the vehicle system 20 may also transmit the image data and the location data to the database 30 via the network 26. In some embodiments, the image and location data may be combined into a single entry, or as linked items in the database 30. In addition, the location data may be stored as metadata with the image data. The image data and location data may transmitted to various devices via the network 26 in real-time, at pre-determined times or intervals, or other suitable times. For instance, the image data and location data may be set to be sent to the network 26 every 5 minutes that the vehicle system 20 is actively receiving the image and location data. Further, the image and location data may be sent in response to detecting a triggering event. For example, the data could be sent to the network 26 after a threshold amount of data has been stored locally in the vehicle system 20. Additionally or alternatively, the data may be sent to various devices via the network 26 after the vehicle system 20 receives a command to stop collecting the image and location data.

In some instances, it may be desirable to identify a vehicle, for instance the vehicle 12, or a driver or passenger in the vehicle 12, based on alert data received by the vehicle system 20. For example, authorities may send alert data with images or a notification describing persons or vehicles that may correspond to persons of interest, suspects in criminal activities, potential victims, and the like. For example, the alert data may include a name, drawing, physical description of the individual(s), a license plate number, a physical description of the vehicle 12, images of the vehicle, images of an individual, or the like. As such, the alert data may include a missing person alert, active shooter alert, or the like.

With this in mind, according to block 78, the vehicle system 20 may determine whether alert data has been received. For example, as mentioned above, the alert data may include a missing person alert or the like. To receive the alert data, the vehicle system 20 may be connected to the network 26 or to a user of the vehicle 14's cell phone, tablet, or other computing device capable of receiving an alert, such as an AMBER or a Silver alert. The alert may come from any source, and some examples include: a tweet, status update, or other social media post from a local authority; a text, email or phone call from a local authority (such as a police unit); an alert sent directly to a computing device or the vehicle system 20 (such as an amber alert); and/or a news article, story, or update from a local news group. In these examples, the alert need not be sent directly from the described sources, and instead, may be sent from a variety of channels. In some embodiments, the vehicle system 20 or other computing device may be programmed to monitor various sources of alert data, such that the alert data may be actively retrieved from the source as soon as it is made available.

If an alert has not been received, the vehicle system 20 may return to the block 72, described above. However, if the alert data is received, the vehicle system 20 may then retrieve the alert data (block 80). In some embodiments, the alert data may include missing person data that may be retrieved from the source of the missing person alert. Additionally or alternatively, the alert data may be retrieved from a local authority or database, such as a website from a local authority. For instance, the website, local authority, or database may store relevant alert data, such as the name of an individual of interest, last known location or associates, age, physical description, image of the individual (e.g., missing person) and the like. The alert data may also include vehicle identifiers such as make, model, year, color, license plate number, and the like. In some embodiments, the vehicle system 20 may submit a request for information from the source containing the alert data after receiving the alert data. The vehicle system 20 may then receive a response, which may include the details of the alert data. The missing person data may then be stored locally on the vehicle system 20.

In some embodiments, the vehicle system 20 may selectively ignore alert data, for instance if the location provided in the alert data is more than a threshold distance away from the location of the vehicle system 20. In some embodiments, the vehicle system 20 may employ a machine learning algorithm to determine if alert data should be ignored or considered. For instance, the vehicle system 20 may determine how likely it is that a missing person of the alert data is within a threshold distance from the location of the vehicle 14 based on when the missing person was indicated as being missing, where the last location was, whether the missing person had access to a vehicle, as well as other factors. For example, if the missing person is listed as being missing at a particular time and date, then the radius of consideration from the last known location of the missing person may be directly proportional to an amount of time that has passed from the listed time and date. In some embodiments, the vehicle system 20 may have parameters that may be set by a user of the vehicle 14 to determine when the alert data should be considered or ignored.

Turning now to the block 82, the vehicle system 20 may, after retrieving the alert data, cross reference the alert data (e.g., description, image data, vehicle data) with the stored image and location data. If the image and location data is stored in the database 30, the vehicle system 20 may retrieve the image and location data from the database 30. This may be done by requesting the data be sent to the vehicle system 20 via the network 26. If the location and image data is stored directly on the vehicle system 22, then the vehicle system 20 may retrieve the location and image data directly from the memory 56. The vehicle system 20 may then cross reference the information provided in the alert data with the stored image and location data to determine if there is a match (block 84). Additionally or alternatively, the vehicle system 20 may send the image and location data to a remote server to perform the cross reference operations. A match may be determined based on the identity of a person or vehicle in the image and location data matches the identity of a person or vehicle in the alert data. For instance, if a license plate number matches between the image and location data and the alert data, then a match may be confirmed. As another example, if facial recognition software of the video system 24 determines the identity of a person in the vehicle 12 based on facial features of a face detected in the image data, and that identity matches the identity of the individual in the missing person data, then a match may be confirmed. In some instances, a near-match may be considered a match, or may be ignored. For instance, if the VIN or license plate of a vehicle is not visible in the image and location data, but the general description of the vehicle closely resembles a general description of a vehicle indicated in the missing person data (for instance, both may be red trucks with a missing headlight, or other similar general descriptions), then a close match may be confirmed.

If no match is confirmed, then the vehicle system may return to block 72, as described above and continue to collect image data and attempt to find a match with the newly acquired image data. If, alternatively, a match or near-match has been confirmed, then the vehicle system 20 may present a notification of the match to the display 62 on the vehicle 14 (block 86). In some instances, the notification may include an audio notification, for example, by announcing to a driver of the vehicle 14 that a match has been found. For example, the notification may cause the vehicle system 20 to automatically launch or execute an application to provide a visual, audible, or haptic notification to the driver. In this way, the user may be notified in substantially real time with respect to the detected match or near-match. The notification may further present an option to the user of the vehicle 14 to selectively show the matching data on the display 62. The notification may also present an option to the user to have the vehicle system 20 send the matching information to a computing device or other electronic destination (e.g., website, database) associated with the proper authority. Additionally or alternatively, the notification may include a reminder nudging the user to contact the authority and present the matching information. In some embodiments, for example if the missing person is a dangerous person, the notification may alert the user of this, so that the user may properly react (by moving away from the vehicle 12, or other precautionary measures).

As shown in block 88, if the user opts to have the vehicle system 20 send the information, or if the vehicle system 20 is programmed to automatically send the information in the event of a match, then the vehicle system 20 may send the matching information, including the image data and the location data, to a proper authority. In some embodiments the matching information may be sent directly through the vehicle system 20. Alternatively, the information may be sent through the user's phone or other computing device, through the vehicle system 20. The information may be sent to the authority through a variety of methods, which may include, but are not limited to: calling in the information (by leaving an automated message or by presenting the call to the user), texting, emailing, or replying to a social media post (Facebook, Twitter, news blog, etc.). The information may be sent to any of a variety of proper authorities. The authorities may include, but are not limited to: the source of the missing person alert, a designated tip service, or another authority from the police, government, etc. The user may select which authority to send the matching information to, or alternatively the vehicle system 20 may be programmed to have matching information sent to one or more pre-selected authorities.

In addition to looking for missing persons, the vehicle system 20 may include further features, such as monitoring driving behavior of a nearby vehicle to create or update a model of the vehicle, which may include driver assessment information for the nearby vehicle. Further, the vehicle system 20 may provide notifications to the driver of the vehicle 14 in response to the driver assessment information for the nearby vehicle. These features, and others, will be described in FIG. 4.

Figure 4:
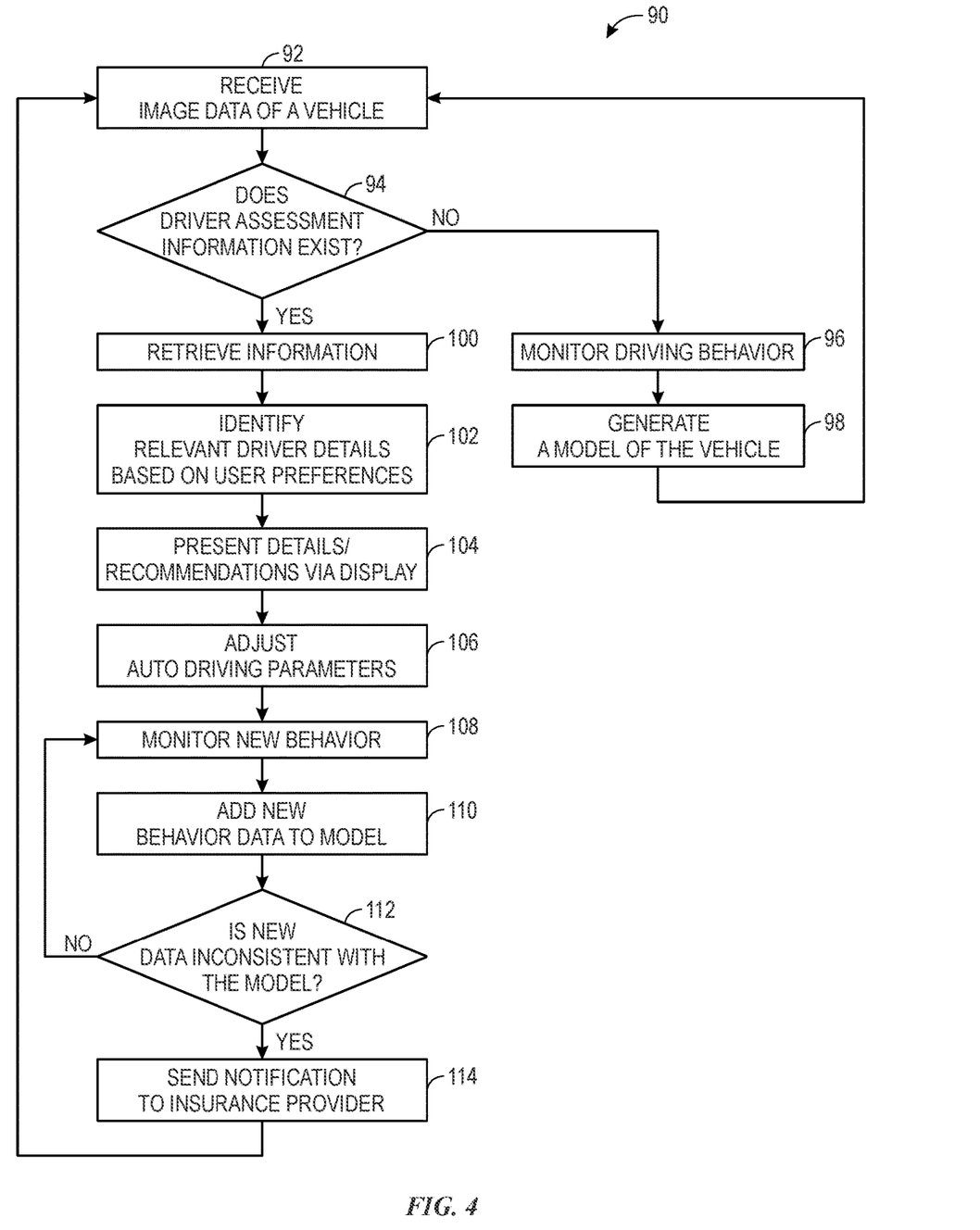
FIG. 4 illustrates a flow chart of a method for observing and reacting to the driving behavior of a nearby vehicle, in accordance with embodiments described herein.

Accordingly, FIG. 4 illustrates a flowchart of a method 90 that may be implemented by the vehicle system 20. Further, although the following description of the method 90 is described in a particular order, it should be noted that the method 90 is not limited to the depicted order; and, instead, the method 90 may be performed in any suitable order. In addition, although the vehicle system 20 is described as performing the method 90, it should be understood that the method 90 may be performed by any suitable computing device including, for instance, the monitor system 28 and the like. Accordingly, in a block 92, the vehicle system 20 may receive image data of the vehicle 12 behind the vehicle 14. The operations of block 92 may match the operations of the block 72 described above.

After receiving the image data, the vehicle system 20 may identify a driver of the vehicle 12 represented in the image data, the vehicle based on vehicle identification information (e.g., license plate), or the like. The vehicle system 20 may then determine whether driver assessment information exists for the vehicle 12, the driver of the vehicle 12, or both (block 94) based on the identity of the driver, the vehicle 12, or both. In some instances, the vehicle system 20 may send a request to a computing system via the network 26 to determine if driver assessment information exists for the driver or vehicle 12. The driver assessment information may include a model representative of expected driving behavior of the driver of the vehicle 12, of the vehicle 12, or both. The model may also include or be generated based on historical data of driving patterns and incidents involving the driver or the vehicle 12.

If the driver assessment is not identified, the vehicle system 20 may begin monitoring the driving behavior of the vehicle 12 (block 96). In some embodiments, the monitored behavior may include, but is not limited to: the speed of the vehicle 12; the proximity of the vehicle 12 to the vehicle 14 or other nearby vehicles or objects, such as highway barriers, road lines, etc.; the acceleration or deceleration of the vehicle 12; the stability of the vehicle 12, including a radius in which the vehicle 12 is swerving; the reaction speed of the vehicle 12 to driving conditions including red and yellow traffic lights, traffic pile-ups, objects in the road, etc.; whether the driver of the vehicle 12 is attentive to the road; and whether the vehicle 12 has caused an accident, such as rear-ending the vehicle 14 or the like.

The monitored driving behavior may be used to generate a model of the vehicle 12 (block 98). The model may include information other than the monitored driving behavior captured by the video system 24. For instance, the model may include meta-data or other data that may indicate a time, location, or both of the monitored behavior. The generated model may then be sent from the vehicle system 20 to the database 30, via the network 26 to add the newly monitored driver assessment information from the model to the database 30. The vehicle system 20 may then resume operations of block 92, as described above.

Returning to block 94, if the driver assessment information for the driver of the vehicle 12 or the vehicle 12 itself exists, then the vehicle system 20 may, as indicated in block 100, retrieve the driver assessment information from the database 30 or other suitable device through the network 26.

In some embodiments, the retrieved data may be a model that represents the behavior of the vehicle 12.

Turning to block 102, the vehicle system 20 may further identify relevant driver details from the driver assessment information. For instance, the user may pre-select certain driving behaviors, such as any of those listed in the operations of block 96, as well as others, to be identified by the vehicle system 20. For instance, a user of the vehicle 14 may desire to only identify driver details in the model of the vehicle 12 related to whether the vehicle 12 has ever rear-ended a vehicle before, and how recently. Additionally or alternatively, the vehicle system 20 may use models to determine how likely the vehicle 12 is to cause a driving incident. For instance, if the vehicle 12 has been in several incidents in the recent history, then there may be a high likelihood that the vehicle 12 will be in another in the near future. The likelihood may consider other driving behaviors, however, and may be more complex. For example, the likelihood may be determined by calculating how long before the vehicle 12 rear-ends the vehicle 14 based on the speed and acceleration of both vehicles. It should be noted that the examples described are not intended to be comprehensive, as the vehicle system 20 may perform many operations to determine the likelihood of future driving behaviors of the vehicle 12.

The vehicle system 20 may then, as in block 104, present the relevant driver assessment information to the vehicle 14 through the display 62. In some embodiments, the display 62 may include an offer to present the data, which the user may accept or decline, rather than instantly presenting the data on the display 62. If the user declines, then the data will not be presented on the display 62. Alternatively, if the user accepts, then the display 62 may present the details of the vehicle model. For example, a notification may cause the vehicle system 20 to automatically launch or execute an application to provide a visual, audible, or haptic notification to the driver. The details may include those pre-selected by the user or may include other default options. The details may include the likelihood of future driving behaviors of the vehicle 12. Further, the display 62 may include an option to change which details are present on the display 62, which may be adjusted in real-time or for future displays of driver assessment information.

Turning now to block 106, the vehicle system 20 may then optionally adjust automatic driving parameters of the vehicle 14. For instance, if there is a high likelihood that the vehicle 12 is about to rear-end the vehicle 14, then the vehicle system 20 may automatically move the vehicle 14 out of the way, for example by speeding up, changing lanes, turning, pulling over, or any other appropriate action. Alternatively, the vehicle system 20 may present a warning to the driver of the vehicle 14. In some embodiments, the warning may include an option to allow the vehicle system 20 to perform reactive measures automatically, such as those described. Alternatively, the vehicle system 20 may suggest to the driver of the vehicle 14 that certain reactive measures be taken, such as those described. This may especially be helpful in instances where the vehicle 14 is autonomous or semi-autonomous. It should be noted that the reactive measures may be taken for any number of driving behaviors of the vehicle 12, and that the example of a rear-end is not intended to be limiting.

Turning now to block 108, the vehicle system 20 may also begin monitoring new driving behavior of the vehicle 12. For instance, once the vehicle system 20 has determined that driver assessment information for the driver of the vehicle 12 exists, the vehicle system 20 may then monitor the vehicle 12 to determine if the current driving behaviors match the driver assessment information for the vehicle 12. The operations of this block may match the operations of the block 96, as described earlier.

The vehicle system 20 may, as described in block 110, add new behavior data to the model for the vehicle 12, which may include the driver assessment information of the vehicle 12. For instance, once the vehicle system 20 receives image data corresponding to a certain driving behavior, such as speeding or swerving, among other examples, the vehicle system 20 may update the model for the vehicle 12. The model may be updated by sending a request to the database 30 through the network 26 to add new behavior data to the model. The request may include the image and location data associated with the driving behaviors and captured by the video system 24 or other means. Additionally or alternatively, the request may include suggested alterations to the model. The suggested alterations may be associated with the observed driving behaviors. The model may include information other than the monitored driving behavior captured by the video system 24. For instance, the model may include meta-data or other data that may indicate a time, location, or both of the monitored behavior. The model may further indicate whether the driver obeys traffic laws, or other similar driving tendencies. For example, consistent cautious driving may lead to a model that represents that the driver of the vehicle 12 is a cautious driver, whereas driving that regularly or somewhat regularly violates traffic laws or other similar driving patterns may lead to a model indicating that the driver of the vehicle 12 is not a cautious driver.

Turning now to block 112, the vehicle system 20 may determine whether the new data added to the model of the vehicle 12 is inconsistent with the existing data in the model. For example, the new data may either show similar driving behaviors, an improvement of driving behaviors, or less-cautious driving behaviors. If the new behaviors matches the previously existing data, then the vehicle system 20 may resume operations of block 108 by monitoring new behavior of the vehicle 12.

However, if the new data is inconsistent with the data in the model, then the vehicle system 20 may send a notification to an authority of the vehicle 12 or the driver of the vehicle 14, as in block 114. For instance, the authority may be an insurance provider of the driver of the vehicle 12. The notification may include a portion or all of the model of the vehicle 12, including the newly detected behavior. For instance, the notification may indicate that there is updated behavior to the model, and may present the new data and how it affects the model. The authority (e.g., the insurance provider) may then use the information gathered from the notification to alter an agreement between the authority and the driver of on the display the vehicle 12. For example, if the newly added data to the model indicates that the driver of the vehicle 12 rear-ended the vehicle 14 wrongfully (i.e., not out of necessity), then the authority, in this case an insurance provider, may alter the insurance agreement between the authority and the driver of the vehicle 12, for example by raising the driver's premium. If instead the newly added data to the model indicates that the vehicle 12 has an improved model, for example by driving more cautiously than in the past, the authority may also consider this behavior and react accordingly.

In some embodiments, the authority may be a police unit. For example, if the newly added data to the model of the vehicle 12 indicates that illegal activity has occurred, for example speeding, crashes, expired registration, etc., then the police unit may be notified and react accordingly. In some embodiments, the driver of the vehicle 14 may be reimbursed for their participation in collecting and submitting driving behavior data to authorities. For instance, the driver of the vehicle 14 may receive a portion of the ticket fee paid by the driver of the vehicle 12 in the case of speeding or other traffic violations.

While only certain features of the invention have been illustrated and described herein, many modifications and changes will occur to those skilled in the art. It is, therefore, to be understood that the appended claims are intended to cover all such modifications and changes as fall within the true spirit of the invention.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for (perform) ing (a function) . . . " or "step for (perform) ing (a function) . . . ," it is intended that such elements are to be interpreted under 35 U.S.C. 112 (f). However, for any claims containing elements designated in any other manner, it is intended that such elements are not to be interpreted under 35 U.S.C. 112 (f).

The invention claimed is:

1. A system, comprising:
   a database comprising image data acquired over a period of time by one or more image sensors coupled to a vehicle and a plurality of driver models; and
   a vehicle system configured to:
   receive alert data comprising an alert associated with a vehicle identifier of an additional vehicle and location data;
   cross reference the alert data with the image data to identify a match between the alert data and the image data;
   present a notification via an electronic display of the vehicle in response to identifying a match between the alert data and the image data;
   determine whether the additional vehicle is associated with one of the plurality of driver models; and
   adjust a driving parameter of the vehicle based on one or more driving behaviors associated with the one of the plurality of driver models in response to determining that the additional vehicle is associated with the one of the plurality of driver models.

2. The system of claim 1, wherein the vehicle system is configured to identify the match between the alert data and the image data based on facial features of an individual and an identity of the individual of the alert data.

3. The system of claim 1, wherein the alert data comprises a missing person report.

4. The system of claim 1, wherein the vehicle system is configured to identify the match between the alert data and the image data based on a license plate number of the additional vehicle and the license plate number of the alert data.

5. The system of claim 1, wherein the notification comprises an option to send information related to the match between the alert data and the image data to a computing device.

6. The system of claim 5, wherein the vehicle system is configured to send the notification to the computing device via a mobile phone associated with a user of the vehicle system.

7. The system of claim 1, wherein the vehicle system is configured to:

determine that the additional vehicle is not associated with the plurality of driver models;
generate an additional driver model based on the image data; and
add the additional driver model to the plurality of driver models.

8. A method, comprising:
receiving, via at least one processor, alert data comprising an alert associated with a vehicle identifier of an additional vehicle and location data;
cross referencing, via the at least one processor, the alert data with image data to identify a match between the alert data and the image data, wherein the image data is acquired over a period of time by one or more image sensors coupled to a vehicle;
presenting, via the at least one processor, a notification via an electronic display of the vehicle in response to identifying a match between the alert data and the image data;
determining, via the at least one processor, whether the additional vehicle is associated with one of a plurality of driver models, wherein the plurality of driver models is stored in a database configured to communicate with the at least one processor; and
adjusting, via the at least one processor, a driving parameter of the vehicle based on one or more driving behaviors associated with the one of the plurality of driver models in response to determining that the additional vehicle is associated with one of the plurality of driver models.

9. The method of claim 8, wherein the match between the alert data and the image data is identified based on facial features of an individual and an identity of the individual of the alert data.

10. The method of claim 8, wherein the alert data comprises a missing person report.

11. The method of claim 8, wherein identifying the match between the alert data and the image data based on a license plate number of the additional vehicle and the license plate number of the alert data.

12. The method of claim 8, wherein the notification comprises an option to send information related to the match between the alert data and the image data to a computing device.

13. The method of claim 12, comprising sending the notification to the computing device via a mobile phone.

14. A non-transitory computer-readable medium comprising computer executable instructions that, when executed, are configured to cause at least one processor to perform operations comprising:
receiving alert data comprising an alert associated with a vehicle identifier of an additional vehicle and location data;
cross referencing the alert data with image data to identify a match between the alert data and the image data, wherein the image data is acquired over a period of time by one or more image sensors coupled to a vehicle;
presenting a notification via an electronic display of the vehicle in response to identifying a match between the alert data and the image data;
determining whether the additional vehicle is associated with one of a plurality of driver models, wherein the plurality of driver models is stored in a database configured to communicate with the at least one processor; and
adjusting a driving parameter of the vehicle based on one or more driving behaviors associated with the one of the plurality of driver models in response to determining that the additional vehicle is associated with one of the plurality of driver models.

15. The non-transitory computer-readable medium of claim 14, wherein the match between the alert data and the image data is identified based on facial features of an individual and an identity of the individual of the alert data.

16. The non-transitory computer-readable medium of claim 14, wherein the alert data comprises a missing person report.

17. The non-transitory computer-readable medium of claim 14, wherein identifying the match between the alert data and the image data based on a license plate number of the additional vehicle and the license plate number of the alert data.

18. The non-transitory computer-readable medium of claim 14, wherein the notification comprises an option to send information related to the match between the alert data and the image data to a computing device.

19. The non-transitory computer-readable medium of claim 18, wherein the computer executable instructions are configured to cause the least one processor to further perform the operations comprising sending the notification to the computing device via a mobile phone.

* * * * *